United States Patent [19]

St. Clair

[11] 3,877,305
[45] Apr. 15, 1975

[54] COMPENSATED ROTARY GAS METER

[75] Inventor: Theodore A. St. Clair, Fairfield, Conn.

[73] Assignee: Textron Inc., Providence, R.I.

[22] Filed: Sept. 4, 1973

[21] Appl. No.: 394,401

[52] U.S. Cl. ................................................. 73/254
[51] Int. Cl. ............................................. G01f 3/08
[58] Field of Search ...... 73/232, 254, 261; 137/500, 137/505.13, 505.37

[56] References Cited
UNITED STATES PATENTS

| | | | |
|---|---|---|---|
| 1,887,400 | 11/1932 | Dayton | 73/254 |
| 1,985,397 | 12/1934 | Bassett | 73/254 |
| 2,189,750 | 2/1940 | Barge | 73/254 |

Primary Examiner—Richard C. Queisser
Assistant Examiner—John P. Beauchamp
Attorney, Agent, or Firm—Arthur A. Johnson

[57] ABSTRACT

There is disclosed herein a gas meter of the rotary type to be located between the inlet port and the outlet port of a gas system and comprising a primary rotor unit designed to meter the volume of gas flowing between said inlet port and said outlet port, and a secondary rotor unit is designed to return from said outlet port to said inlet port a quantity of gas substantially equal to the amount of gas which unavoidably leaks through the primary rotor unit in which means responsive to rate of flow of the gas through the meter controls the quantity of gas returned to the inlet port by said secondary rotor unit, the rate of flow of the gas being determined by pressure differential across the inlet port and the outlet port of the primary rotor, the respective pressures acting on pressure responsive valve means to control the quantity of gas returned to the inlet port of the primary rotor by the secondary rotor in each cycle of operation of the latter, and a manually operable valve is settable to adjust the return flow according to the leakage characteristic of the particular meter when being proved.

10 Claims, 1 Drawing Figure

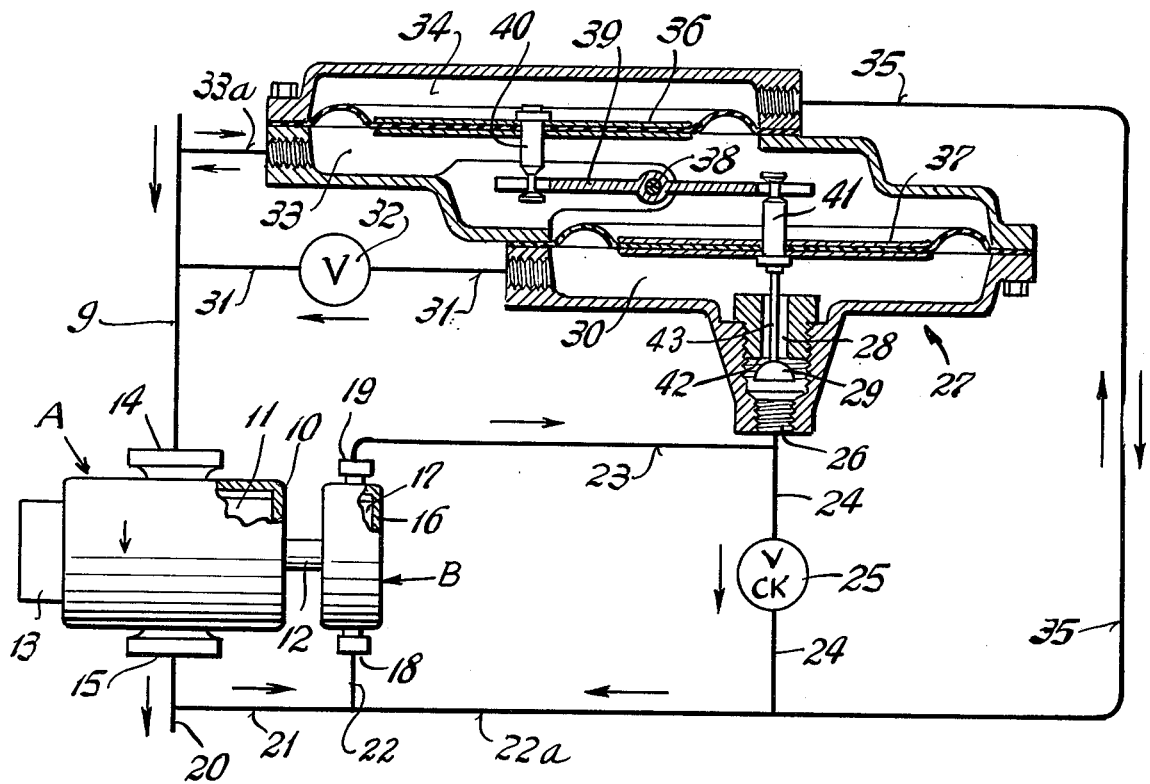

COMPENSATED ROTARY GAS METER

This invention relates to gas meters of the rotary type and more particularly to improved means for compensating for the unmeasured gas that leaks, i.e., bypasses between the surfaces of the vanes of the rotor and surface of the stator chamber when the vanes rotate therein.

It is well known in the art that a weakness of rotary type meters is that extremely small running clearances are required to achieve reasonably accurate measurements of the gas flowing through the meter. While the proportion of such leakage or unmeasured gas to measured gas is substantially the same at normal flow rates, the proportion of the leakage is substantially different when the flow rates are abnormally high or abnormally low. For example, at a normal flow rate of 20,000 cfh, for which the meter was designed, with a leakage of 30 cfh, the leakage rate would be 0.15 percent; while at a flow rate of 2,500 cfh the leakage rate would be 1.2 percent which results in the meter having only 98.8 percent accuracy.

When the flow rate of gas is in the high ranges, for instance, between 20,000 cfh and 50,000 cfh, the differential pressure across the inlet and outlet rises sharply and since in a rotary meter bypass leakage increases as the square root of the differential pressure, it is apparent that the leakage rates substantially increase and the leakage represents a serious economical loss to the supplier, not only by reason of the proportion of measured to unmeasured gas but also because of the increased volume of gas consumed at high flow rates.

To maintain high accuracy of about 98.8 percent prior to my invention the closest practical tolerances had to be observed in the manufacture of the rotor and stator portions of rotary type meters.

It is an object of my invention to compensate, in a rotary gas meter system, for the flow of bypass leakage gas, so as to give an accurate measurement of the gas consumed regardless of the flow rate of the gas flowing through the meter.

In my copending application Ser. No. 378,708, filed July 12, 1973, means are disclosed which are particularly concerned with compensating for bypass leakage at low flow rates and which comprises a primary rotor unit and a secondary rotor unit connected to the inlet and the outlet of the primary rotor unit to return to the inlet of the primary rotor a volume of gas substantially equal to the volume of bypass leakage gas and controlled by a metering valve which is adjusted manually when proving or checking the meter.

Such means which are comparatively simple are highly satisfactory for correcting bypass leakage in the normal range of flow rate for which a meter is designed. However, for larger bypass leakage occasioned by excessively high flow rates, the species of my invention disclosed in said application is not adequate. This is because the recycle flow rate varies somewhat inversely as the bypass flow rate varies.

An object of the species of my invention, as represented by the disclosure in this present application, is to provide means whereby the flow rate of returning leakage gas, i.e., the recycle flow rate, is always substantially equal to the meter bypass leakage regardless of the flow rate of the gas.

Briefly stated this is accomplished by the present invention by providing recycling means including circuit means for automatically returning the leakage gas from the outlet of the meter to the inlet thereof, and said conduit means including pressure responsive valve means which are responsive to the value of differential pressure that exists across the meter.

As in the form of my invention disclosed in said copending application, the rotary gas meter disclosed herein has two rotor units, that is, a primary rotor unit through which the stream of gas flows from the inlet port to its outlet port and has means by which it is intended to measure the volume of gas consumed, and a secondary rotor unit driven by the primary rotor unit in synchronism therewith, and recycling conduit means for returning the bypass leakage gas from the outlet port of the primary rotor unit to the inlet port thereof, so that at each cycle of operation of the primary rotor leakage gas can be added to the gas to be measured.

For the purpose of proving-in the meter and for making readjustment to correct for wear of the parts, a manually adjustable valve is inserted in the conduit means between the pressure responsive valve means and the inlet of the primary rotor. Attention is called to U.S. Pat. No. 3,782,196 of Jan. 1, 1974 for Temperature Compensated Rotary Gas Meter.

Other features and advantages will hereinafter appear.

In the accompanying drawing:

The single FIGURE is a schematic view showing in section the pressure responsive bypass leakage compensating means of the present invention, and on a substantially smaller scale the primary rotor unit and the secondary rotor unit of the meter and the conduit means between the parts of the apparatus.

As shown in the drawing, the rotary gas meter of the present invention comprises a primary rotor unit A having a stator 10 and a rotor 11 which is carried by a shaft 12 which operates an index mechanism 13 which counts the revolutions of the shaft 12 and totalizes the volume of gas passing through the meter from an inlet 14 to an outlet 15.

The degree of accuracy of a rotary type meter depends in part on the closeness of the fit between the stator and rotor. Some tolerances in the dimensions of the stator and rotor are necessary to permit the free rotation of the rotor 11 under the force of the gas passing through the meter. To maintain close clearances between the relatively moving parts substantially increases the cost of manufacturing the meter, but even with reasonably close tolerances there is the unavoidable bypass leakage, the amount of which depends somewhat on the characteristics of each individual meter.

The present invention has solved the problem of leakage due to clearances by determining for each particular meter the percentage of such leakage which exists to the volume of gas flowing and providing for the return of the leakage gas to the inlet side of the rotor unit A to be measured.

For this purpose the present invention provides a secondary rotor unit B having a stator 16 and a rotor 17, an inlet port 18 and an outlet port 19. For convenience in illustration the rotor 17 is arranged to cause the gas to flow in the direction opposite to that of rotor 11 of the unit A.

As shown in the drawing, the outlet port 15 of the primary rotor A has an outlet conduit 20 connected by conduits 21 and 22 to the inlet port 18 of the secondary rotor unit B. Driven by the shaft 12, the rotor 17 of the rotor unit B causes the gas to flow through conduits 23, 24 and 22a toward the conduit 22. However, before the gas reaches the conduit 22 it must pass through a differential pressure check valve 25 adjusted to maintain a minimum pressure level of the gas in conduit 23. Above this level conduit 24 would be open to return flow to conduits 22a and 22 to the inlet 18 of the secondary rotor unit B.

Being thus impeded the gas from the rotor unit B flows into an inlet 26 of a pressure responsive unit 27 from which it passes through an orifice 28 having a metering valve 29 which controls the flow of gas into a chamber 30 so as to limit the flow to an amount substantially equal to the volume of the leakage gas. From the chamber 30 recycled leakage gas flows through conduit 31 to an intake conduit 9 and hence to the inlet port 14 of the rotor A.

In the more specific aspects of this invention there may be a manually adjustable valve 32 which may be adjusted when proving or when checking the meter according to the leakage characteristics of the particular meter being tested.

The pressure responsive unit 27 of the present invention comprises a body made to form three chambers--a middle chamber 33 having a conduit 33a connecting it with the inlet conduit 9, a chamber 34 having a conduit 35 connecting it with the conduit 22a leading to the outlet conduit of the rotor unit A, and the chamber 30 which, as stated above, is connected to the inlet conduit 9. Between the chambers 33 and 34 there is a movable diaphragm 36 and between the chambers 33 and 30 there is a movable diaphragm 37.

Mounted in the chamber 33 on pivot pin 38 is a lever 39 connected at one end by post 40 to the diaphragm 36 and at the other end by a post 41 to the diaphragm 37. The valve 29 has a valve stem 43 connected to the post 41 to open and close the orifice of metering valve 29 depending on the differential gas pressure in the chambers 33 and 34 and thus allows more or less recycled gas to return to the primary rotor unit. Gas pumped in the secondary rotor unit which cannot pass through the valve 28 being in excess of that fed back to the inlet 9 of the primary rotor unit is returned through conduit 24, check valve 25 and conduits 22a and 21 to the outlet 20 of the primary rotor unit A.

Regarding the mode of operation of the embodiment of my invention disclosed herein, assuming that chamber 34 is at outlet pressure P1, being connected to the meter outlet by conduits 20, 21, 22a and 35, also that chamber 33 is at meter inlet pressure P2, being connected through line conduit 9 and 33a to the inlet 14, the differential pressure which exists at the inlet and outlet of the meter imparts movement to the diaphragm 36 and so loads the lever 39 as to impose a similar load (in the reverse direction) on the diaphragm 37. Chamber 30 is fed gas through the valve 29 from the conduit 23 leading to the pump outlet 19, and is at pressure P3.

Pressure P3 and pressure P2 are maintained equal to pressure P2 and pressure P1 and the throttling of the valve 29 under the control of pressure P3. If pressure P3 at outlet 19 should fall, the valve 28 would move away from the seat 42 and permit more gas to flow into chamber 30 hence to inlet conduit 9. If pressure P3 should rise, the valve 28 would move toward the seat 42 reducing the flow of gas to inlet conduit 9. Thus, the differential pressure across the valve 32 is maintained constant and equal to the differential pressure across the meter for a given flow rate and changes equally as the meter differential changes.

With valve 32 adjusted, the accuracy equation becomes:

$$A = \frac{\left(Q_2 - q_1 \sqrt{\dfrac{h_2}{h_1}} \overset{\text{By-pass leakage}}{\phantom{xxxxxx}} + q_1 \sqrt{\dfrac{h_2}{h_1}} \overset{\text{Recycled}}{\phantom{xxxxxx}}\right)100}{Q_2} = 100$$

where:
$Q_2$ is a flow rate at differential pressure $h_2$
$q_1$ is the bypass leakage rate when the differential pressure is $h_1$
$A$ is the percent meter accuracy.

Instead of employing as the auxiliary gas impelling medium a rotor and stator, any satisfactory gas impelling means may be utilized, such as, for instance, a reciprocating pump, and the term "rotor" as used herein is equivalent to a reciprocating pump means.

Variations and modifications may be made within the scope of this invention and portions of the improvements may be used without others.

I claim:

1. A rotary gas meter having a rotor unit having inlet means and outlet means, said rotor unit having a rotor and a stator and having a capacity to measure in each cycle of rotation a predetermined volume of gas including a determinable volume of bypass leakage gas resulting from clearance between said rotor and said stator of said rotor unit, and means including conduit means, pumping means operated by said rotor and means responsive to the flow rate of the gas passing through the meter for returning from said outlet means to said inlet means of said rotor unit through said conduit means during each cycle of operations thereof a volume of gas substantially equal to said volume of bypass leakage gas.

2. A rotary gas meter according to claim 1 in which said means responsive to the flow rate of the gas passing through the meter includes pressure sensitive means for sensing the pressure differential across said inlet means and said outlet means of the meter, and metering valve means controlled by said sensing means to regulate the volume of bypass gas returned to said inlet means of the meter by said pumping means.

3. A rotary gas meter according to claim 2 in which said means for sensing said pressure differential comprises a first pressure responsive means in communication with said inlet means, a second pressure responsive means in communication with said outlet means through said metering valve means, connection means connecting said first pressure responsive means and said second pressure responsive means in opposition to each other, and means actuated by said connection means for automatically causing the movement of said metering valve means in a closing or an opening direction and in an amount in accordance with the variations in said pressure differential.

4. A rotary gas meter according to claim 1 in which said pumping means for returning the volume of bypass leakage gas to the inlet means includes a second rotor unit having a rotor and a stator which has a capacity to flow a volume of gas at least equal to the maximum volume of bypass leakage gas, and there are means for returning to the outlet of the meter that portion of the gas which is in excess of that required to equal the volume of the bypass leakage gas.

5. A rotary gas meter according to claim 2 in which said means for returning the volume of bypass leakage gas to the inlet means includes a manually adjustable valve which may be adjusted during the proving of the meter to regulate the volume of leakage gas to be returned according to the leakage characteristic of the particular meter being proved.

6. A rotary gas meter according to claim 1 in which said rotor unit is a primary rotor unit, and said pumping means for returning said volume of leakage gas comprises a secondary rotor unit driven by said primary rotor unit, said conduit means including means connecting said primary rotor unit and said secondary rotor unit, said secondary rotor unit having a capacity to return from said outlet means through said conduit means to said inlet means of said primary rotor unit at each cycle of the secondary rotor unit a volume of gas substantially equal to the volume of said bypass leakage gas.

7. A rotary gas meter having a primary rotor unit having inlet means and outlet means, said primary rotor unit having a rotor and a stator and having a capacity to measure in each cycle of rotation a predetermined volume of gas including a determinable volume of bypass leakage gas resulting from clearance between said rotor and said stator of said primary rotor unit, a secondary rotor unit having inlet means and outlet means and having a rotor and a stator, driving means for connecting the rotor of said primary rotor unit to the rotor of the secondary rotor unit for synchronous operation, said secondary rotor unit having a capacity to flow a volume of gas at least as great as said volume of bypass leakage gas, conduit means connecting said outlet means of said primary rotor unit to said inlet means of said secondary rotor unit, and additional conduit means including a metering valve means connecting said outlet means of said secondary rotor unit with said inlet means of said primary rotor unit, said additional conduit means including pressure sensitive means responsive to the flow rate of the gas passing through said primary rotor unit for returning from said outlet means thereof to said inlet means thereof during each cycle of operation thereof a volume of gas substantially equal to said volume of bypass leakage gas.

8. A rotary gas meter according to claim 7 in which said pressure sensitive means comprises a first pressure responsive means in communication with said inlet means of said primary rotor unit, a second pressure responsive means in communication with said outlet means of said primary rotor unit through said metering valve, connection means connecting said first and second pressure responsive means in opposition to each other, and means operated by said connection means for automatically causing the extents of movements of said metering valve means in a closing or opening direction in accordance with variations in said pressure differential.

9. A rotary gas meter according to claim 7 in which said secondary rotor has a capacity to flow a volume of gas in excess of the determinate volume of leakage gas and there are means for returning to the outlet of the primary rotor unit that portion of the gas which is in excess of that required to equal the volume of bypass leakage gas.

10. A rotary gas meter according to claim 7 in which said additional conduit means includes a manually adjustable valve which may be adjusted during the proving of the meter to regulate the volume of bypass leakage gas returned according to the leakage characteristic of the particular meter being proved.

* * * * *